Aug. 9, 1949.
S. B. CRARY
2,478,622
REGULATOR SYSTEM
Filed June 1, 1946
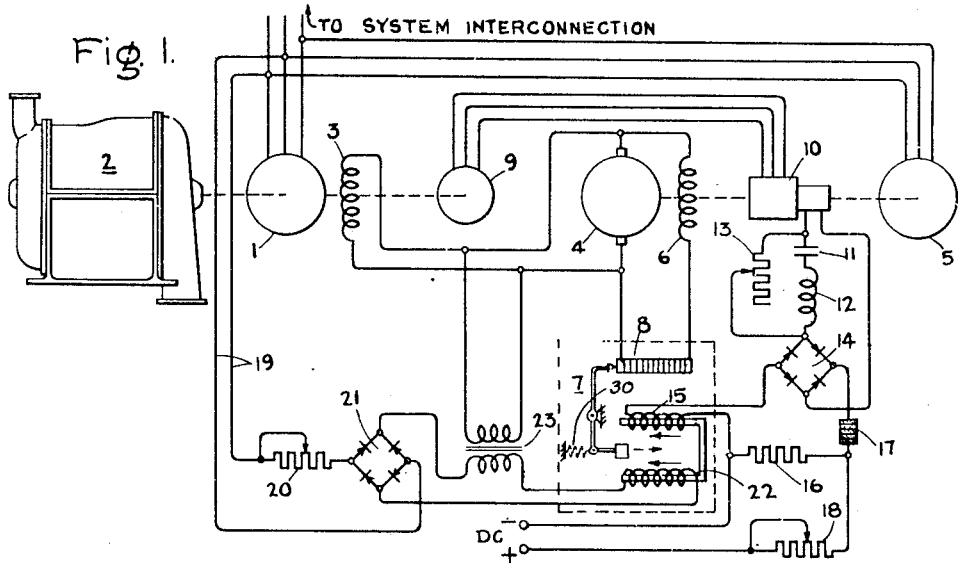
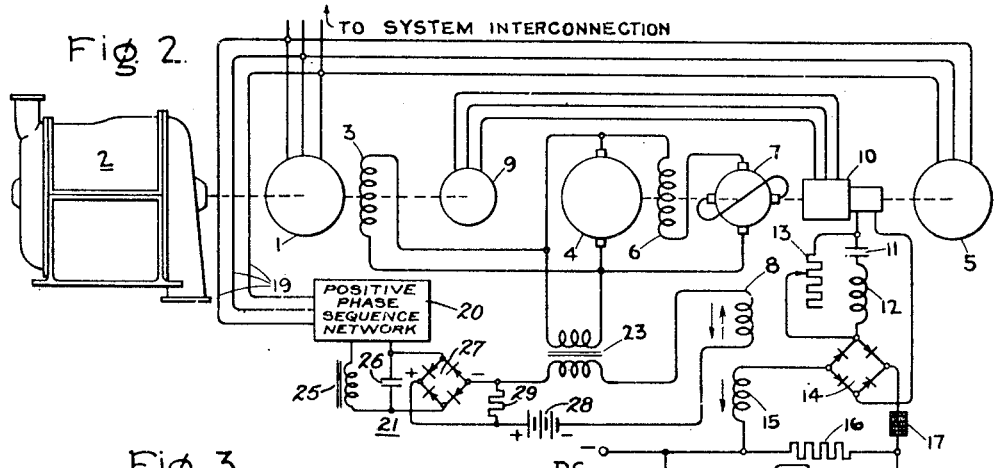
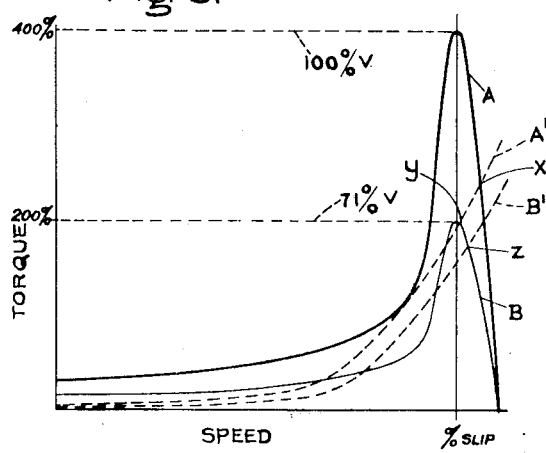
Inventor:
Selden B. Crary,
by Prowell S. Mack
His Attorney.

Patented Aug. 9, 1949

2,478,622

UNITED STATES PATENT OFFICE 2,478,622

REGULATOR SYSTEM

Selden B. Crary, Schenectady, N. Y., assignor to General Electric Company, a corporation of New York Application June 1, 1946, Serial No. 673,731

14 Claims. (Cl. 322—24)

My invention relates to regulator systems and more particularly to improvements in automatic voltage regulator systems for synchronous generators.

In the last twenty years there has been a significant trend to the unit-type of synchronous generator station wherein each generating unit is self sufficient with respect to its electrically and steam driven auxiliaries including the excitation means for the alternating current generator. It has been customary to provide a direct connected exciter for the synchronous generator because of the increased reliability of such means of excitation. However, the direct connected exciter introduces additional difficulties into the design and operation of such generating units.

One method of providing excitation for the synchronous generator now increasing in favor for the higher speed units is the use of an induction motor driven exciter set in which the induction motor is supplied power from the main A.-C. system to which the local synchronous generating unit is connected. With the use of present type automatic voltage regulators, during a system disturbance causing the alternator terminal voltage to decrease, the voltage regulator will attempt to maintain normal terminal voltage on the alternator to prevent loss of synchronism, and will force the field excitation thereby applying an increased exciter load on the induction motor drive at a time when its input voltage is low. Under these conditions of low input voltage and heavy exciter load, the induction motor will be overloaded and cannot maintain speed, and if the disturbance remains for any appreciable length of time and is of sufficient severity, the slip of the induction motor drive will increase until the maximum torque point is reached, after which the motor will slow down and excitation of the alternator will be almost completely lost, resulting in possible loss of synchronism of the main generator and further aggravation of the system disturbance. This has resulted in the use of oversize induction motors and their resulting inefficiency under normal operating conditions.

Accordingly, it is an object of my invention to provide a new and improved automatic regulation system for synchronous generators.

Another object of my invention is to provide an automatic regulating system for alternating current generators, for preventing excessive loading of the exciter driving means during system disturbances.

A further object of my invention is to provide automatic regulating means for an induction motor driven exciter set for limiting the loading of the exciter as a function of the exciter set speed.

In accordance with my invention, I have provided a means for limiting the load on the induction motor driving the exciter to a value consistent with the maximum power availability of the induction motor for any given value of terminal voltage on the motor. The maximum torque of the induction motor is essentially a predetermined function of its slip for a given terminal voltage, and, if the exciter voltage, and consequently the power it will supply to the alternator field and the load it will place upon the motor drive, is limited so that the slip of the induction motor drive does not increase above a value corresponding to its pullout or maximum torque, the reliability of the motor driven exciter set will be improved and the generator will not lose synchronism with the system as a result of failure of its excitation source due to an abnormal decrease in speed of the exciter set. I provide apparatus for measuring the exciter set slip in terms of frequency by comparing the generator frequency with a frequency proportional to the motor speed, this apparatus including a tachometer generator and a Selsyn receiver which functions to give a variable voltage and frequency proportional to the value of the slip of the induction motor. This slip proportional voltage is compared with a standard reference voltage and upon reaching a certain predetermined value slightly less than the maximum value of slip that can be tolerated without pullout of the motor, the excess voltage is applied to an operating coil of the voltage regulator in a direction to oppose the tendency of the regulator to continue forcing the exciter voltage to higher values. This effectively prevents the voltage regulator from forcing the exciter to excessive load values thereby increasing the slip of the induction motor drive, and prevents overloading of the induction motor to a point where its maximum torque is reached and alternator excitation is greatly reduced.

The invention will be better understood from the following description taken in connection with the accompanying drawings, and its scope will be pointed out in the appended claims. In the drawings, Fig. 1 illustrates diagrammatically an embodiment of my invention showing a voltage regulator with the exciter set slip limiting feature; Fig. 2 is a modification of the system as shown in Fig. 1 in which an amplidyne generator is substituted for the rheostatic element of the voltage regulator for controlling the direct current exciter for the alternator, and Fig. 3 illustrates several of the performance characteristics of a motor driven exciter set operated in accordance with my invention.

Referring now to the drawing and more particularly to Fig. 1, I have shown a three phase alternating current generator 1 connected to supply power to a synchronous alternating current system. The alternator is driven at synchronous speed by a prime mover shown as a fluid pressure turbine 2 and the alternator embodies the customary rotating field construction having a field winding 3 excited by a direct current exciter 4. The direct current exciter 4 is mechanically driven by a polyphase induction motor 5 which receives its electrical power from the output of the alternator 1, or from the interconnected system for starting purposes. The direct current exciter 4 is provided with a shunt field winding 6 in which the field current is controlled by a voltage regulator shown generally at 7. A variable resistance 8 is in series with the shunt field winding 6 and effective to vary the exciter output and field excitation of the alternator in response to system voltage conditions, as will be more fully described.

For obtaining a direct measurement of the value of slip in the induction motor exciter set, a small three phase alternating current generator 9 of the tachometer or permanent magnet type is mechanically connected to the shaft of the alternator 1 and, therefore, produces an alternating current frequency equal to that generated by the main alternator 1 and supplied to the induction motor 5. The output of the tachometer generator 9 is applied to the three phase stator winding of a conventional Selsyn receiver 10. The rotating single phase field winding of the Selsyn 10 is mechanically connected to the shaft of the induction motor 5, and, therefore, revolves at the same speed as the induction motor exciter set and at a speed which differs from the rotating field in the stator winding of the Selsyn 10 by a small value equal to the slip of the induction motor, assuming that the proper pole ratio exists between the generator and induction motor, corresponding to their synchronous speeds. As long as the induction motor is running under no load, the value of the slip will be very low and the frequency and voltage output of the Selsyn rotor will also be very low, however, as the slip of the induction motor increases due to increased exciter load, the differential speed between the rotating field in the stator of the Selsyn receiver and the speed of the Selsyn rotor increases, thereby increasing the voltage and the frequency output of the Selsyn rotor. The output of the Selsyn rotor is tuned by means of the capacitance 11, inductance 12 and shunting resistor 13 so that a maximum variation in voltage may be obtained in the region of slip approaching the slip corresponding to the maximum electrical torque for the particular induction motor used.

The tuned output of the Selsyn rotor is applied to the input terminals of a full-wave rectifier 14 which is preferably of the copper oxide type. The output terminals of the rectifier 14 are connected in series with the bucking coil 15 of the voltage regulator, the fixed resistance 16 and the thyrite resistor 17. The thyrite resistor 17 has a non-linear negative impedance voltage characteristic; therefore, a slight increase in voltage across the thyrite will produce a disproportionately greater flow of current in the circuit, resulting in increased sensitivity and response of the circuit. A standard source of direct current voltage is also applied across the resistor 16 as shown, and its value may be adjusted by means of a variable resistance 18. The circuit as thus described provides a voltage measuring or comparison circuit in which the output voltage of the rectifier, which is proportional to the slip of the induction motor, is compared to a standard predetermined direct current voltage. At values of slip approaching the value of full load slip of the induction motor, the voltage output of the rectifier will equal the standard voltage and any increase in motor slip will cause an increased voltage to appear across the resistor 16 and coil 15. This excess voltage is then effective to cause a current flow in the bucking coil 15 of the voltage regulator, thereby reducing the net electromagnetic force available to adjust the variable resistance 8 of the regulator and preventing the regulator from forcing the output of the exciter to a higher value, with the result that the exciter load on the induction motor is prevented from increasing to a value that would overburden and seriously reduce the speed of the induction motor drive.

The voltage regulator 7 may be of the direct acting rheostatic type or of the carbon pile type and is responsive to the output voltage of the alternator 1 by means of a voltage taken from the terminals of the alternator by the conductors 19 and passed through an adjusting resistance 20 and a full-wave rectifier bridge 21. The unidirectional output of the rectifier is then impressed on the operating coil 22 of the voltage regulator 7 in such a direction as to actuate the regulator mechanism which is balanced against a spring 30, to effect a decrease in the value of resistance 8 and, therefore, increase the amount of excitation supplied to the alternator 1 under conditions of decreasing terminal voltage of the alternator. A stabilizing transformer 23 is provided having one winding in parallel with the exciter output and the other winding in series with the voltage regulator coil 22, os as to damp out any tendency of the regulating circuit to oscillate.

For a better understanding of the operation of my invention, reference should now be made to Fig. 3. Curve A of Fig. 3 shows the speed-torque characteristic for a conventional induction motor with rated applied voltage in which the point of maximum or pullout torque is reached at a value of slip usually between 4 to 9 per cent, depending on the design and application of the motor. Curve A' represents the speed-load characteristic of the exciter 4 under conditions of normal terminal voltage on the generator and with the regulator attempting to increase the exciter voltage to a maximum or ceiling value. It will be seen that the point x at the intersection of the exciter load curve and the motor torque curve indicates the value of slip at which the motor will operate when the exciter is supplying ceiling excitation and under conditions of rated terminal voltage on the induction motor. If it is assumed that the terminal voltage supplied to the induction motor decreases due to system disturbances, the characteristic speed-torque curve of the induction motor will be considerably reduced, as shown by the curve B which represents the speed-torque characteristic of the motor when operating at about 71 per cent of rated terminal voltage. It will be seen that the torque available from the motor at any given speed at this reduced voltage is one-half the value available at rated voltage. With the motor running at reduced voltage, the load on the exciter will now almost equal the value of maximum torque of the driving motor, and any further reduction in motor terminal voltage due to system conditions will decrease the torque available from the induction motor to a value less than the exciter load, and the motor will pass the maximum torque point and quickly drop in speed with almost total loss of excitation on the alternator. Since this condition of reduced voltage on the driving motor has resulted in a greater amount of slip of the motor, as represented by the point $y$, there has now been a certain increase in slip and this is effective to apply an increased bucking flux in the coil 15 of the voltage regulator. The increase in slip and consequent increase in bucking effect in the regulator operates effectively to prevent any increase in the exciter load, and as the value of slip increases the tendency of the regulator to increase exciter load is overcome and an actual reduction in exciter load is accomplished by the proportionately greater increase in bucking flux in the regulator coil 15. Exciter load is reduced due to the increased slip and the characteristic speed-load curve of the exciter under conditions of reduced terminal voltage on the driving motor and resultant increased slip is then represented by the curve B'. The intersection of curves B and B' at point $z$ then represents the point of operation of the motor driven exciter set at reduced voltage, and it can be seen that the induction motor is now operating in a stable portion of its speed-torque characteristic and will be prevented from reaching the maximum torque point. The load on the induction motor is, therefore, automatically regulated at a safe value and the motor-driven exciter set will be maintained in a stable condition irrespective of a large range of terminal voltage changes on the induction motor drive. It will be understood that the motor speed-torque curves A and B and the corresponding exciter load curves A' and B' are merely representative of two values of motor terminal voltage on the exciter set. For any values of terminal voltage between 71 and 100 per cent, there will be a corresponding pair of motor speed-torque curves and exciter load curves lying in the area between curves A and B, and A' and B', respectively. The slip responsive circuit and associated bucking coil 15 in the regulator may be adjusted so that at any value of slip, for example greater than that shown as point $z$ of Fig. 3, the voltage regulator will be ineffective to increase exciter load. Any further increase in slip due to further reduction in motor terminal voltage will result in a decrease in exciter output until stability is again restored at a value of slip corresponding to point $z$ of Fig. 3.

In the modification shown in Fig. 2, I have substituted for the conventional voltage regulator 7 an amplidyne-type of dynamo-electric machine which may be, for example, of the compensated armature reaction excited type as described and claimed in U. S. Patent No. 2,227,992 issued upon an application of M. A. Edwards and E. F. W. Alexanderson and assigned to the assignee of this invention. The amplidyne 7 is arranged to be driven by the induction motor 5, and its output energizes the field winding 6 of the exciter 4. The output of the amplidyne is controlled by a buck and boost field winding 8, the flux of which is in a direction to provide increased excitation upon a decrease in alternator terminal voltage and to decrease excitation upon an increase in terminal voltage. A basic level of excitation is provided for the amplidyne by the field winding 22 in which a constant component of flux is produced. This is supplied with energy from the direct current source as shown and a variable resistor 24 is provided to adjust this basic amount of excitation for the amplidyne. For energizing the control field 8 of the amplidyne, I have shown a positive phase sequence network shown generally at 20 and fully described and claimed in the pending application of Frederick E. Crever, Serial No. 538,933, filed June 6, 1944, now Patent 2,407,476, issued September 10, 1946, and assigned to the same assignee as the present invention. Also used in conjunction with the positive phase sequence network is a nonlinear voltage sensitive network shown generally at 21. The positive phase sequence network 20 provides a single phase alternating current voltage value that is representative of the voltage condition existing on all three phases of the generator 1. This single phase voltage is applied to the nonlinear voltage sensitive network 21, and the resulting reversible direct current voltage is used to energize the control field 8 to produce a bucking or boosting flux for the amplidyne generator 7. The nonlinear voltage sensitive network includes a reactor 25 and capacitor 26 in series circuit relationship. The voltage appearing across the capacitor 26 is applied to a full-wave rectifier bridge 27, and the resultant direct current voltage output is compared with a source of voltage represented by the battery 28 and the differential voltage thus applied to the buck and boost control field 8. The fixed resistor 29 is inserted across the output terminals of the rectifier to permit the flow of current in both directions which otherwise would be prevented by the unidirectional characteristic of the rectifier 27. Thus when the alternator voltage is low, the output of the positive phase sequence network will be low and the direct current voltage appearing across the resistor 29 will be less than the voltage of the battery 28. This will cause current to flow in the control field in a direction to produce a boosting flux, thus raising the excitation applied to the alternator 1. Conversely, when the alternator voltage is higher than normal the direct current voltage appearing across the resistor 29 from the rectifier bridge will be greater than the voltage of the battery and current will flow in the opposite direction in the control field 8, producing a bucking flux which is effective to reduce the net excitation of the amplidyne and, in turn, the excitation of the alternator 1. The particular circuit shown for the nonlinear voltage sensitive network 21 is not important in itself as there are a number of other equally satisfactory circuits which may be employed to produce a direct current voltage of greater magnitude and variation than the applied variable alternating current voltage. Any of these circuits may be used to provide the reversible current flow for energizing the buck and boost field winding 8. Thus for a decreasing terminal voltage, the polarity of current flow in control field 8 is in a direction to produce a boosting flux, whereas for a condition of increasing terminal voltage the polarity is reversed and a bucking flux is produced in the field 8. This variable flux in field 8, together with the constant flux in field 22, combine to produce a net excitation flux in the amplidyne that is regulatory of alternator excitation in response to alternator terminal voltage. Thus in the event of a fault or system disturbance, the positive phase sequence voltages appearing at the output terminals of the alternator 1 will be reduced and the amplidyne will function to increase excitation of the alternator, thereby attempting to restore the alternator terminal voltage to its required value. A stabilizing transformer 23 is provided, as in Fig. 1, to damp out any tendency of the regulating circuit to hunt or fall into oscillation.

As in Fig. 1, the slip frequency responsive circuit of Fig. 2 is identical except that the resultant direct current voltage, which is proportional to the slip frequency of the induction motor 5, is applied to a bucking control field 15 of the amplidyne and is, therefore, effective to reduce the net flux available for excitation of the amplidyne when a value of slip of the induction motor corresponding to the predetermined allowable value has been reached.

The modification of my invention as shown in Fig. 2 is, therefore, similar to the apparatus disclosed in Fig. 1 and operates in a similar manner, with the exception that the alternator voltage sensitive circuit shown in Fig. 2 is responsive to the voltage condition existing on all three phases of the regulated machine instead of single phase response as shown in Fig. 1. With the regulating system as herein described, it will be understood that reliable apparatus has been provided for controlling the excitation of synchronous generators when such generators are equipped with a separate induction motor driven exciter set. The exciter set slip control will operate to maintain the maximum amount of excitation on the alternator that the exciter set is capable of providing even during periods of low voltage due to severe system faults or disturbances. Although excitation on the alternator may be reduced below that required for maximum alternator output, sufficient excitation may be maintained to prevent the alternator from losing synchronism with the interconnected power system. By means of my invention, the load on the exciter is controlled so that it will never exceed the available power output of its induction motor drive, irrespective of input voltage fluctuations on the induction motor. Therefore, the possibility of stalling the induction motor drive due to excessive exciter load is minimized and maximum utilization is made of the available power of the separately driven exciter set.

While I have shown and described particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States, is:

1. An automatic regulating system for an electric generator comprising, in combination, a field winding for said generator, a voltage regulator for said generator, a dynamo-electric exciter for supplying field current to said generator and arranged to be driven by an electric motor, means responsive to the load on said driving motor, for limiting the operation of said voltage regulator in increasing the voltage of said generator, said load responsive means being effective upon attainment of a predetermined value of load on said driving motor to render said voltage regulator ineffective to increase said generator voltage.

2. An automatic regulating system for a synchronous generator having a field winding comprising, in combination, an electric motor driven exciter for supplying energizing current to said field winding, a voltage regulator for said synchronous generator, and means non-linearly responsive to the load on said electric motor for modifying the action of said regulator to limit the output of said exciter to a predetermined maximum value below the maximum torque on said motors.

3. An automatic regulating system for a synchronous generator comprising, in combination, a field winding for said generator, a dynamo-electric exciter for supplying field current to said generator and arranged to be driven by an electric motor, means responsive to the output voltage of said generator for controlling said exciter output, means responsive to speed variations of said driving motor from a predetermined speed value, and means actuated by said speed responsive means upon a predetermined decrease in the speed of said motor to render said voltage responsive means ineffective to increase said exciter output.

4. An automatic regulating system for an electric generator comprising, in combination, a field winding for said generator, a dynamo-electric exciter for supplying energy to said field winding, an induction motor for supplying driving power to said exciter, means responsive to a voltage condition of said generator for controlling the output of said exciter to maintain said generator voltage constant, and means responsive to the value of slip of said induction motor and operative to limit the maximum output of said exciter upon attainment of a predetermined maximum value of slip of said induction motor.

5. An automatic regulating system for an electric generator comprising, in combination, an excitation supply system for said generator including a dynamo-electric machine driven by an electric induction motor, means responsive to generator voltage for varying the excitation of said dynamo-electric machine to maintain constant said generator voltage, and means responsive to the value of the slip of said induction motor for inversely varying the excitation of said dynamo-electric machine, said voltage responsive means being rendered ineffective by said slip responsive means at a predetermined value of motor load.

6. An automatic regulating system for a synchronous generator having a field winding comprising, in combination, an excitation supply system for said generator field winding including a direct current generator having a first and a second control field windings, an electric induction motor arranged to drive said direct current generator, means responsive to a voltage condition of said synchronous generator for varying the excitation of said first control field winding, and means responsive to the value of the slip of said electric motor for varying the excitation of said second control field winding in opposition to the excitation on said first control field winding and effective above a predetermined value of slip to limit the output power of said direct current generator.

7. An automatic regulating system for a synchronous generator comprising, in combination, an excitation supply system for said generator including an induction motor driven direct current generator for supplying field current to said generator, a first and second control field windings for said direct current generator and arranged in opposition, means responsive to the positive phase sequence voltages of said synchronous generator for varying the excitation of said first control field winding, and means responsive to the value of slip of said induction motor for varying the excitation of said second control field winding and effective above a predetermined value of motor slip to limit the load on said inductor motor.

8. A field excitation supply control system for a synchronous generator comprising, in combination, a field winding for said generator, a dynamo-electric machine for controlling the supply of energy to said field winding, a first and a second control field winding for said machine, an induction motor for supplying driving power to said machine, means responsive to the positive phase sequence voltages of said generator for inversely varying the excitation of said first control field winding to maintain constant said generator output voltage, and means responsive to the value of slip of said induction motor and effective in excess of a predetermined value of slip of said induction motor to energize said second control field winding in a direction to oppose the excitation of said first control field winding.

9. A field excitation supply control system for a synchronous generator comprising, in combination, a field winding for said generator, a dynamo-electric machine for supplying energy to said field winding, an induction motor for supplying driving power to said machine, voltage regulating means responsive to the output voltage of said generator for varying the excitation of said machine to maintain constant said generator output voltage, and means responsive to the value of slip of said induction motor arranged to oppose said voltage regulating means, said slip responsive means rendering said voltage responsive means ineffective to increase excitation of said machine upon attainment of a predetermined value of motor slip.

10. An automatic regulating system for a synchronous generator comprising, in combination, an automatic voltage regulator for said generator, an induction motor driven exciter for supplying field current to said generator, and means responsive to the value of slip of said induction motor and effective to limit field excitation of said generator upon attainment of a predetermined value of slip of said motor, said slip responsive means including dynamo-electric means for generating a frequency output proportional to the slip of said motor, a tuned rectifier circuit for producing a unidirectional current proportional to said value of motor slip and means for applying said unidirectional current to said voltage regulator in a direction to limit generator voltage increasing action of said regulator.

11. An automatic regulating system for a synchronous generator comprising, in combination, an induction motor driven exciter for supplying field current to said generator, output controlling means for said exciter, generator voltage responsive means for adjusting said exciter output controlling means, means responsive to the value of slip of said induction motor effective to modify said exciter output controlling means upon attainment of a predetermined value of slip of said motor, said slip responsive means including dynamo-electric apparatus for generating an electrical quantity proportional to the slip of said motor, and means for producing a unidirectional current disproportionate to the value of said electrical quantity.

12. A load limiting regulator system for a motor driven generator set comprising an electric generator for supplying energy to an external circuit, excitation control means for said generator, a driving motor for said generator, means responsive to speed variations of said driving motor from a predetermined speed value, and means actuated abruptly by said speed responsive means upon a predetermined decrease in the speed of said motor below said predetermined speed for rendering said excitation control means ineffective to increase the said generator energy output.

13. A load limiting regulator system for a motor driven generator set comprising a generator for supplying electrical energy to a variable load, excitation control means for said generator responsive to an electrical condition of said load, an induction motor for driving said generator, an alternating current supply for said induction motor, and means responsive to a predetermined value of slip of said induction motor and effective to prevent said excitation control means from increasing said generator output.

14. A load limiting regulator system for a motor driven generator set comprising a generator for supplying electrical energy to a variable load, excitation control means for said generator responsive to an electrical condition of said load, an induction motor for driving said generator, an alternating current supply for said induction motor, and means responsive to a predetermined value of slip of said induction motor and effective to prevent said excitation control means from increasing said generator output, said slip responsive means including a dynamo-electric machine arranged to be driven by said induction motor for generating an electrical quantity directly proportional to the value of slip of said motor.

SELDEN B. CRARY.

REFERENCES CITED

The following references are of record in the file of this patent:

UNITED STATES PATENTS

| Number | Name | Date |
|---|---|---|
| 795,462 | Turbayne | July 25, 1905 |

Certificate of Correction

Patent No. 2,478,622                                      August 9, 1949

SELDEN B. CRARY

It is hereby certified that errors appear in the printed specification of the above numbered patent requiring correction as follows:

Column 4, line 12, for "vltage" read *voltage*; line 39, for "degrease" read *decrease*; line 46, for "os" read *so*; column 8, line 13, for the word "motors" read *motor*; column 9, line 12, for "inductor" read *induction*;

and that the said Letters Patent should be read with these corrections therein that the same may conform to the record of the case in the Patent Office.

Signed and sealed this 14th day of March, A. D. 1950.

[SEAL]

THOMAS F. MURPHY,
*Assistant Commissioner of Patents.*